May 12, 1959      H. MÜLLER      2,886,631
MULTI-CONDUCTOR ELECTRIC POWER CABLES
Filed Aug. 28, 1953
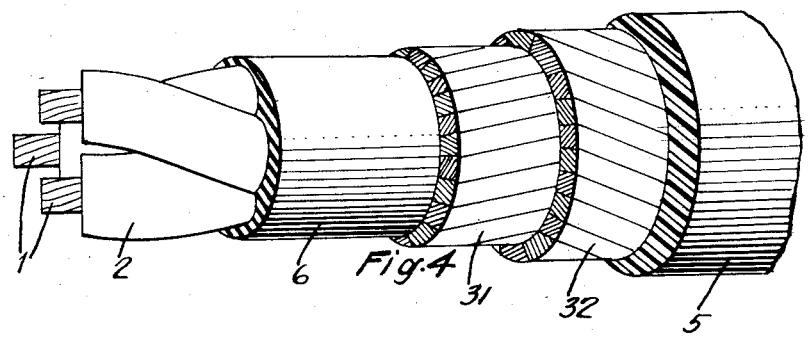
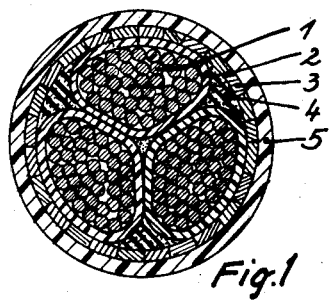
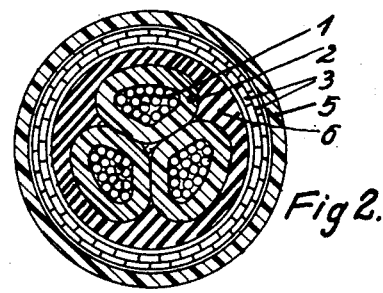
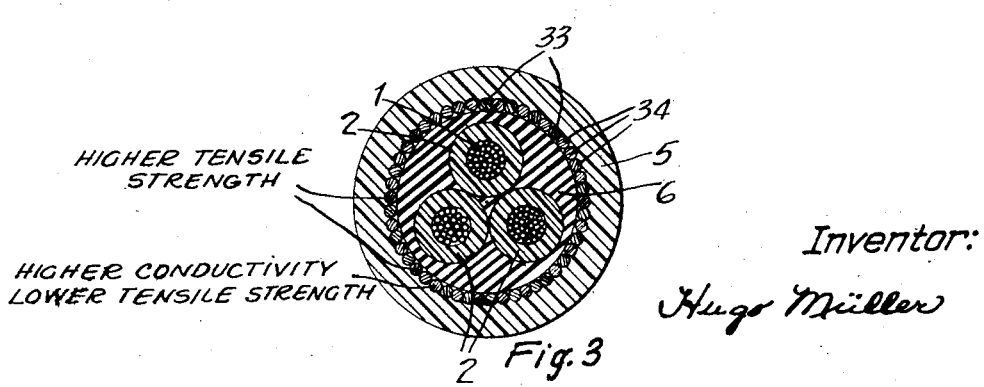
Inventor:
Hugo Müller

2,886,631
MULTI-CONDUCTOR ELECTRIC POWER CABLES

Hugo Müller, Berlin-Spandau, Germany, assignor to Siemens-Schuckertwerke Aktiengesellschaft, Berlin-Siemensstadt, Germany, a corporation of Germany Application August 28, 1953, Serial No. 377,146

Claims priority, application Germany September 4, 1952

1 Claim. (Cl. 174—108)

My invention relates to non-metallically sheathed, fixed underground electric power cables whose individual conductors are insulated with thermoplastic material on the basis of polymers or mixed polymers of vinyl chloride, and whose exterior sheathing consists of the same insulating material.

It is among the objects of my invention to reduce the diameter of such cables for any given electrical requirements and to thus reduce the amount of cable material, while also improving the cables as regards susceptibility to electrical and mechanical defects.

To this end, and in accordance with a feature of the invention, the bunched-wire power conductors that are twisted or roped together within the cable and that, if desired, may be surrounded by a common insulating covering in the interior of the cable, are concentrically surrounded by a common additional conductor which serves for grounding or nulling and is enclosed by the exterior, electrically-insulating sheathing of the cable.

Such cables are applicable for various power transmission and distribution purposes, for instance in indoor installations or as underground cables, for low and medium voltages up to about 6 kv.

In the drawing, Figs. 1, 2 and 3 illustrate by way of example and in cross section three respective embodiments of cables according to the invention, said cables being designed for three-phase current transmission with three main conductors and a nulling conductor. Fig. 4 is a perspective view of the embodiment shown in Fig. 2.

The cable according to Fig. 1 has three sector-shaped main conductors 1 each consisting of a bunch of stranded wires. Each main conductor is individually insulated by a covering 2, for instance, of an artificial plastic on the basis of polyvinyl chloride. The insulation 2 may be placed upon the bunched-wire conductor, for instance, by seamless extrusion molding or any other covering method, or it may be composed of a number of foils spun or wound onto the conductor. The three main conductors 1 are roped together and are surrounded by a nulling conductor 3 formed by a rope layer of flat wires. The gusset spaces 4 between the main conductors and the concentric zero conductor 3 are filled with run-in material, for instance of bituminous regenerate compound. The nulling conductor 3 is surrounded by the exterior protective sheathing 5 of the cable which also consists of polyvinyl chloride plastic or mixtures thereof with polyisobutylene.

The concentric arrangement of the nulling conductor in such cables affords a number of conjoint advantages. In the first place, the cable has a reduced diameter and hence requires a smaller amount of material, thus resulting in reduced manufacturing cost, in comparison with the conventional cable design in which the nulling conductor is roped together with the power conductors. Furthermore, the concentric conductor in a cable according to the invention also performs some of the functions of the metal sheath and armor of customarily designed cables. In the event of damage, the concentric conductor prevents the flow of uncontrolled grounding currents, and when the cable sheath should become mechanically damaged by excavation tools such as spades, pickaxes or the like, the nulling conductor prevents the tool from penetrating down to the main conductors.

Cables according to the invention may be laid in sloping terrain without entailing such difficulties as may result from migration of material, for instance, in cables with a fluid-impregnated dielectric. For that reason, cables according to the invention are also suitable for vertical installation, for instance, in shaftways or the like. In this case, it is preferable to give the concentric grounding or nulling conductor a corresponding design and dimensioning, as exemplified by the cable shown in Fig. 2.

The cable according to Fig. 2 is especially designed for vertical installation. The three main conductors 1 which, as in the embodiment of Fig. 1, have a sector-shaped cross section and are individually insulated by polyvinyl chloride material, are surrounded by an interior insulating covering 6 which also fills the gusset spaces. The covering 6 is surrounded by the concentric fourth conductor 3 which, in this case, serves also as a supporting member and for that reason is composed of two layers of flat wires. As shown in Fig. 4, for the prevention of torsional tension, these two layers 31, 32, corresponding to the concentric fourth conductor 3 in Fig. 2, are roped onto the covering 6 with mutually opposite directions of pitch. The pitch of the inner layer is preferably in opposition to the pitch of the three main conductors 1. An exterior protective sheath 5 of insulating material surrounds the conductor 3.

The concentric conductor 3 is preferably made of a metallic material which, aside from sufficient electric conductance, possesses high mechanical strength. Mainly suitable for this purpose are hard aluminum alloys, for instance on the basis of aluminum-magnesium-silicon. In certain cases, steel may be used especially in view of the fact that the conductors are effectively protected from corrosion by the exterior protective sheathing.

According to still another possibility within the present invention, as illustrated in Fig. 3, the concentric grounding or nulling conductors may consist partly of wires 33 of highly conductive material such as copper or aluminum, and to another part of metal of lesser conductivity but greater mechanical strength such as bronze or steel wires 34. With such a conjoint use of different materials for the nulling conductor, the good conducting wires are preferably so dimensioned that their total cross section corresponds to that needed for maintaining the desired grounding or nulling conditions. These wires are ararnged with a uniform spacing from each other, and the pull-resistatnt wires of the mechanically stronger material are placed in between, thus forming an interrupted and peripherally continuous layer of wires. Such a design composed of good conductive wires and wires of high tensile strength is not limited to wires of circular cross section but is also applicable with flat or profile wires.

The invention, however, is not limited to the embodiments illustrated and described in the foregoing. For instance, such cables may be given a different number of main conductors. The concentric grounding or nulling conductor, instead of being composed of flat wires, may also be made of round wires. Such modifications will be obvious to those skilled in the art upon a study of this disclosure, and may be employed without departure from the essence of my invention and within the scope of the claim annexed hereto.

I claim:

A multi-conductor electric power cable, comprising a group of at least three main conductors, each conductor comprising a bunch of stranded wires of a predetermined helical pitch sectorially arranged about a common axis to form said group, each of said main conductors being individually surrounded by a layer of flexible organic elastomer insulating material selected from the group consisting of highly polymerized vinyl chloride and vinyl chloride isobutylene mixed polymers, a hollow nulling conductor comprising two radially contiguous layers of flat wires, uniformly spaced first ones of said flat wires of said nulling conductor being of highly conductive material, and uniformly spaced other ones thereof being of higher tensile strength than said first ones, each layer of wires being circularly arranged and roped in helical pitch longer than said predetermined pitch and in mutually opposite directions about said common axis and surrounding said group of conductors, additional insulating material filling the gusset spaces between said main conductors, and a protective sheath consisting of said elastomer insulating material concentric with and exterior of said nulling conductor.

References Cited in the file of this patent

UNITED STATES PATENTS

| | | |
|---|---|---|
| 388,477 | Conner | Aug. 28, 1888 |
| 1,698,704 | Middleton | Jan. 8, 1929 |
| 2,106,060 | Ostrander | Jan. 18, 1938 |
| 2,141,290 | Carlson | Dec. 27, 1938 |
| 2,230,481 | Bromley | Jan. 30, 1939 |
| 2,446,387 | Peterson | Aug. 3, 1948 |
| 2,586,345 | King | Feb. 19, 1952 |
| 2,731,510 | Brazier | Jan. 17, 1956 |
| 2,754,351 | Horn | July 10, 1956 |

FOREIGN PATENTS

| | | |
|---|---|---|
| 163,202 | Switzerland | July 31, 1933 |

OTHER REFERENCES

Vinylite Resins (publication), Carbide and Carbon Chemicals Corp., copyright 1942, page 20.

General Electric (publication), Type SS GEA-2408, June 1936 (8 page pamphlet). (Copy in Division 69.)